Patented July 29, 1924.

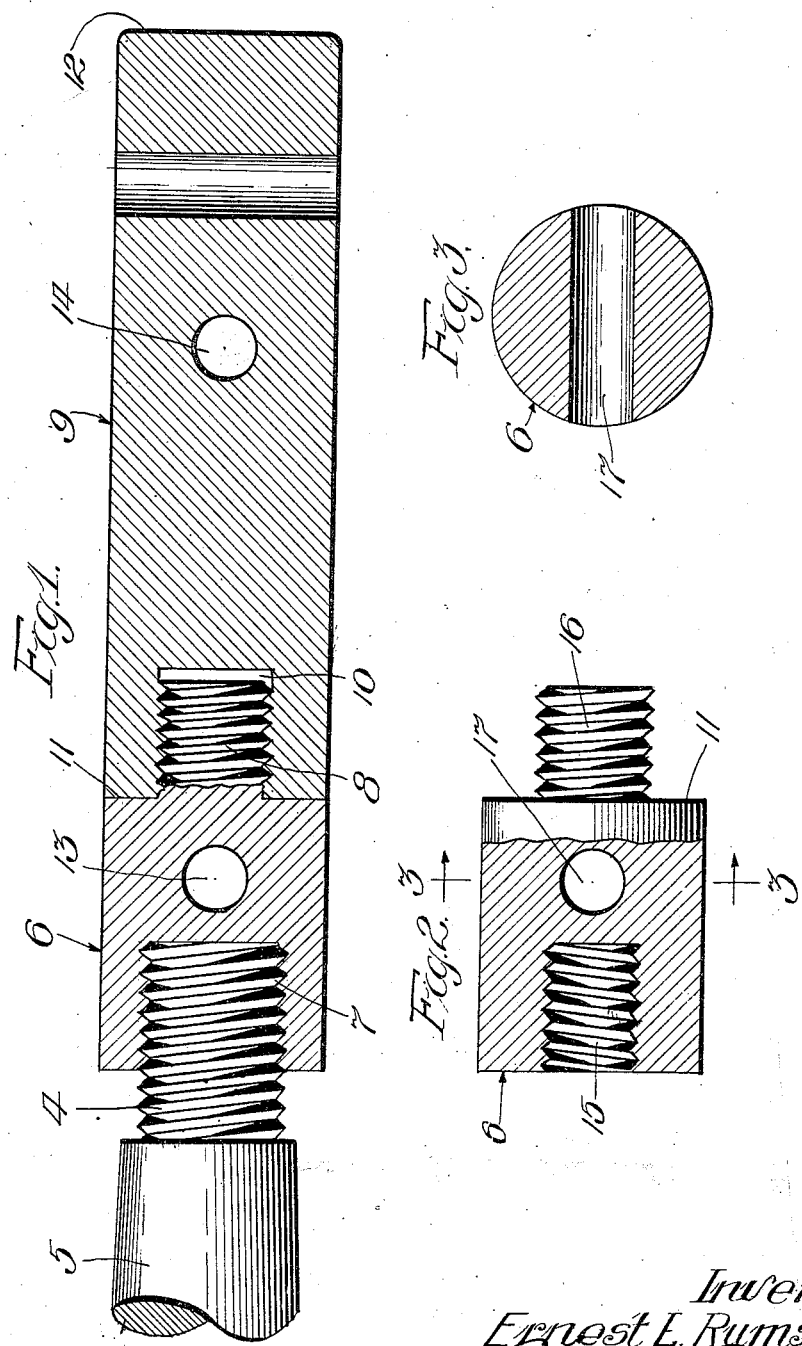

1,503,249

UNITED STATES PATENT OFFICE.

ERNEST L. RUMSFIELD, OF CHICAGO, ILLINOIS.

TOOL FOR REMOVING WHEELS FROM AXLE SHAFTS OF MOTOR VEHICLES AND THE LIKE.

Application filed April 9, 1923. Serial No. 630,702.

*To all whom it may concern:*

Be it known that I, ERNEST L. RUMSFIELD, a citizen of the United States, residing at Chicago, in the county of Cook and State of Illinois, have invented certain new and useful Improvements in Tools for Removing Wheels from Axle Shafts of Motor Vehicles and the like, of which the following is a specification.

This invention has to do with certain improvements in tools. The invention relates particularly to improvements in tools such as are used for removing wheels from axle shafts of motor vehicles and the like.

The present invention relates more particularly to a tool which is used to assist in loosening up the wheel from the axle by making it possible to tap or pound the end of the axle while exerting a pull on the wheel with respect to the axle.

More particularly the invention relates to certain improvements in a construction of cap which can be put over the threaded end portion of the axle, and which cap will protect said threaded end portion and receive the direct blows of the hammer or other implement.

In connection with the foregoing, it is to be noted that axle shafts of different sizes and makes are provided with different pitches and sizes of threads, so that many different caps would have to be provided in the ordinary course of work in order to meet the conditions of all of the different axles which are usually worked upon.

If each of these caps were to be formed as a complete self-contained unit with a head portion or member of proper size and shape to receive the direct blows of the hammer or other implement, it would be necessary to provide a series of large and unwieldy tools for the set, at a large cost of manufacture, and which would occupy a considerable amount of space.

The main object of the present invention is to provide a tool comprising a cap member and a head member which are separate elements, the cap member being provided with an internally threaded socket which can be threaded onto the end portion of the axle shaft, and being relatively as small as it is convenient to make it, and the cap and head members being provided with companion connecting means whereby they may be joined together in order to establish a complete tool of proper form and characteristics to do the work.

In connection with the foregoing, it is a further object to provide a set of the cap members which have internally threaded sockets of different sizes and different characteristics of threads, so that a set of these cap members will meet the different requirements imposed by the different axle shafts usually encountered in motor vehicle service, all of the caps being of substantially the same internal dimensions, and all of the caps being provided with connecting means of the same size and characteristics, so that they can be used interchangeably with a single head member.

Still more particularly a further object is to make provision for connecting any particular cap with the head member by a threading operation, and to also provide the cap members and the head member with convenient means whereby they may be easily threaded together or unthreaded in order to establish the different combinations.

Other objects and uses of the invention will appear from a detailed description of the same, which consists in the features of construction and combinations of parts hereinafter described and claimed.

In the drawing:

Figure 1 shows a longitudinal section through the head member and one of the cap members, the cap member being threaded onto the end of an axle shaft which is to be operated upon;

Fig. 2 shows a fragmentary section through another cap member having an internally threaded socket of different size from that shown in Fig. 1, but having an externally threaded end lug of the same size as that of Fig. 1 to receive the internally threaded socket of the head member; and Fig. 3 shows a cross section taken on the line 3—3 of Fig. 2, looking in the direction of the arrows.

For purposes of illustration I have in Fig. 1 shown the tool as being applied to the externally threaded projecting end 4 of the axle shaft 5. In Fig. 1, I have shown the cap member 6 which comprises a circular block of steel or other metal, the same having an internally threaded socket 7 of proper threads to receive the threaded end portion 4 of the axle shaft. Said internally threaded socket 7 of the cap member 6 is preferably of only such depth as will take a portion of the threaded end of the axle shaft, so that when the cap member is tightened up the threaded end portion 4 will set against the bottom of the internally threaded socket of the cap member.

The cap member 6 is also provided with a projecting externally threaded lug 8 opposite to the position of the internally threaded socket 7.

The head member 9 preferably comprises a circular bar of steel or the like of a length which can be conveniently grasped and manipulated in the hand of the worker. This head member 9 is preferably of the same diameter as the cap member 6, as shown in Fig. 1.

The head member 9 is provided in one end with an internally threaded socket 10 having threads of proper characteristics to receive the externally threaded lug 8. Furthermore, the socket 10 is preferably deep enough to fully accommodate the threaded lug 8 without jamming against the end of the threaded lug. This will insure that the end surfaces of the cap member and head member will come into solid engagement at the surface 11, as shown in Fig. 1. As a consequence, when the two sections of the tool are threaded together they will present the appearance of a continuous bar of metal, with a circular crack at the plane of the surfaces 11.

The other end 12 of the head member is preferably flattened, as shown in Fig. 1, so as to establish a convenient surface on which the pounding may be performed.

The cap and head members may be provided with transverse perforations 13 and 14 respectively through which pins may be inserted in order to facilitate turning the two sections with respect to each other in order to tighten them up or disconnect them.

In Fig. 2 is shown another cap member 6 which, however, is provided with an internally threaded end socket 15 of different size or different threads from the socket 7 of the cap member 6. This socket 15 is also preferably the same depth as the socket 7 of the head member 6.

The socket 15 is intended to thread onto an axle shaft of different characteristics from the axle shaft 5. The cap member 6 is also provided with an externally threaded end lug 16 opposite to the position of the socket 15, the end lug 16 being of the same threading as the end lug 8 of the cap member 6. Furthermore, the end lug 16 is preferably of less length than the depth of the socket 10 of the head member 9. Consequently, the cap member of Fig. 2 can be used interchangeably with the cap member of Fig. 1 in connection with the head member 9, and when used in connection with said head member will establish a practically continuous tool suitable for use with a different axle shaft.

The cap member of Fig. 2 may also be provided with a transverse perforation 17 by which it may be conveniently threaded and unthreaded with respect to the head member.

It is thus possible to establish a complete set of cap members which are interchangeably usable in connection with a single head member thus greatly enlarging the usefulness of the head member, enlarging the usefulness of the set of tools as a set, reducing the cost of the set of tools, and reducing their weight and bulk.

While I have herein shown and described only certain embodiments of the features of my present invention, still I do not limit myself to the same, except as I may do so in the claims.

I claim:

1. A tool for the purpose specified comprising in combination a handle member in the form of a cylindrical bar of steel or the like having at one end an inwardly reaching internally threaded socket, the other end being adapted for operation by a suitable pounding tool, and a cap member of cylindrical form of substantially the same diameter as the handle member, said cap member having on one end an externally threaded lug of size and threads adapted to thread into the socket of the handle member, said lug being of less elevation than the depth of the socket of the handle member, whereby the cap member may be threaded flush against the end portion of the handle member, and there being an inwardly extending internally threaded socket in the end of the cap member opposite to its lug aforesaid, the cap member socket being of size and thread according to the size and thread of the axle shaft with which it is intended to be used, there being a transverse socket in the handle member and a transverse socket in the cap member, said socket being for the reception of pins or tools to engage and disengage the cap member with the handle member, substantially as described.

2. A tool for the purpose specified comprising in combination a handle member in the form of a cylindrical bar of steel or the like having at one end an inwardly reaching internally threaded socket, the other end being adapted for operation by a suitable pounding tool, and a cap member of cylindrical form of substantially the same diameter as the handle member, said cap member having on one end an externally threaded lug of size and threads adapted to thread into the socket of the handle member, and there being an inwardly extending internally threaded socket in the end of the cap member opposite to its lug aforesaid, the cap member socket being of size and thread according to the size and thread of the axle shaft with which it is intended to be used, substantially as described.

ERNEST L. RUMSFIELD.